Feb. 2, 1960

T. W. NICHOLSON 2,923,333

CENTERING LOG-BARKER ROLL HOLD-DOWN

Filed Sept. 28, 1956

INVENTOR.
THOMAS W. NICHOLSON
BY
Reynolds, Beach & Christensen
ATTORNEYS

INVENTOR.
THOMAS W. NICHOLSON
BY
Reynolds, Beach & Christensen
ATTORNEYS

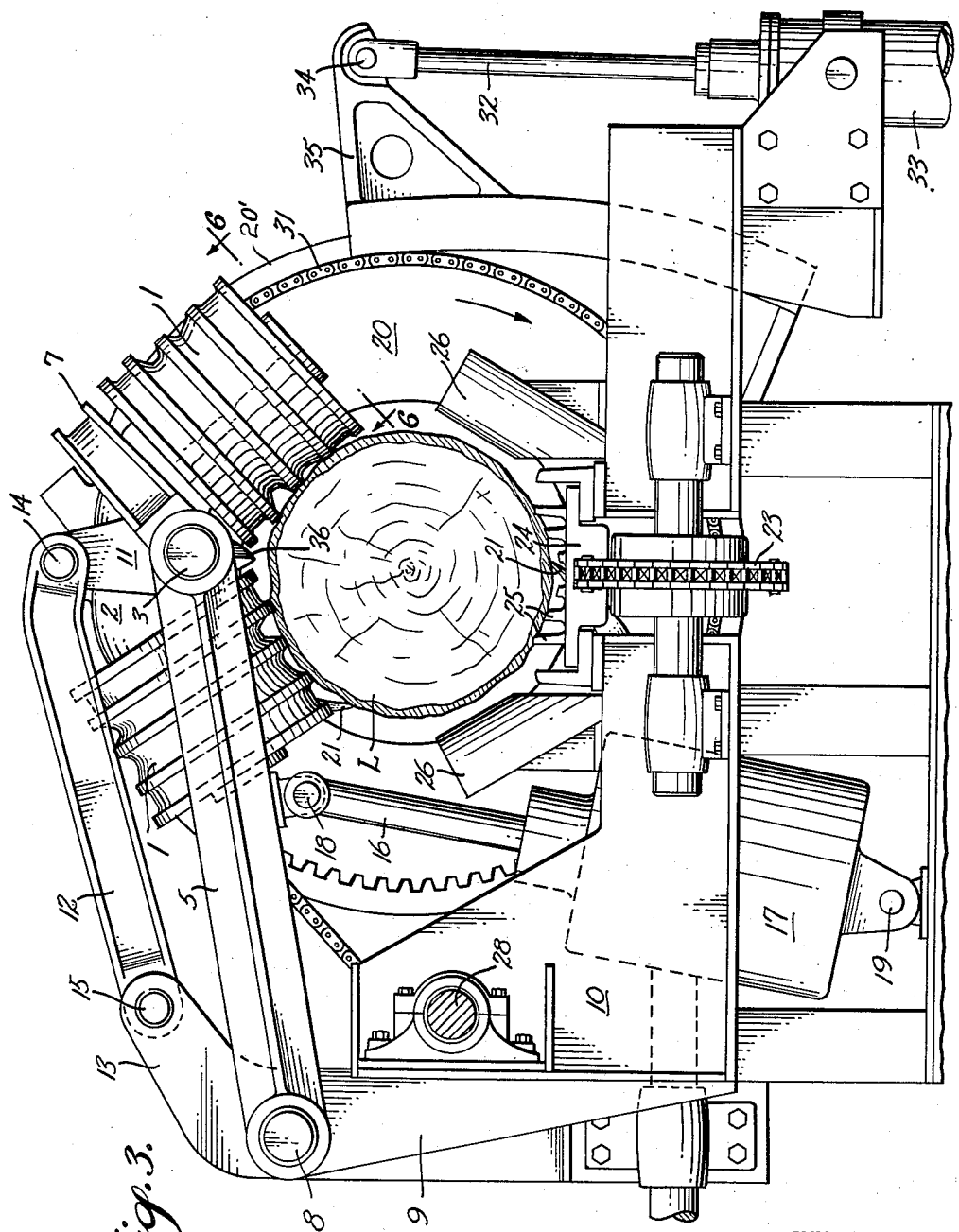

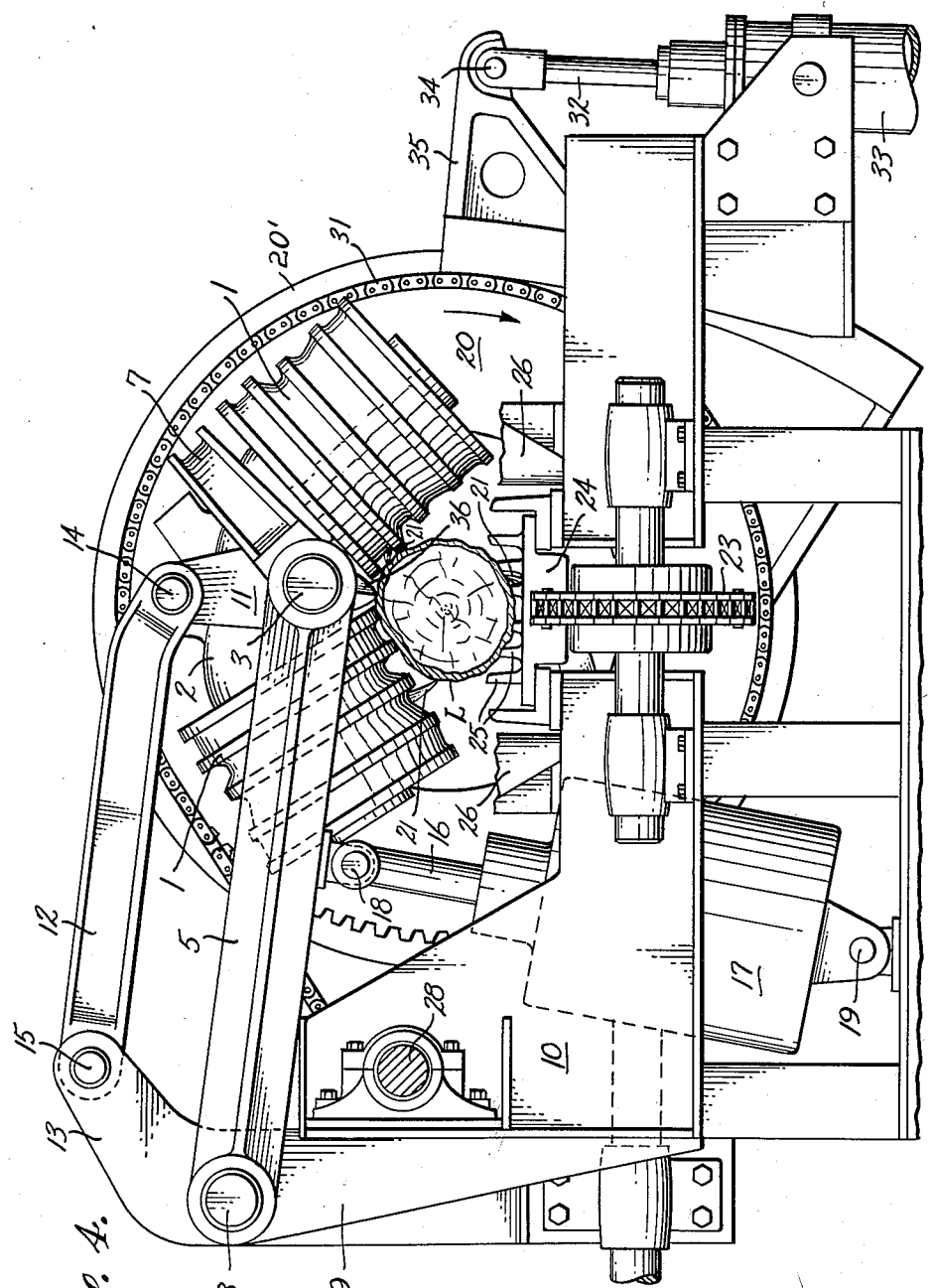

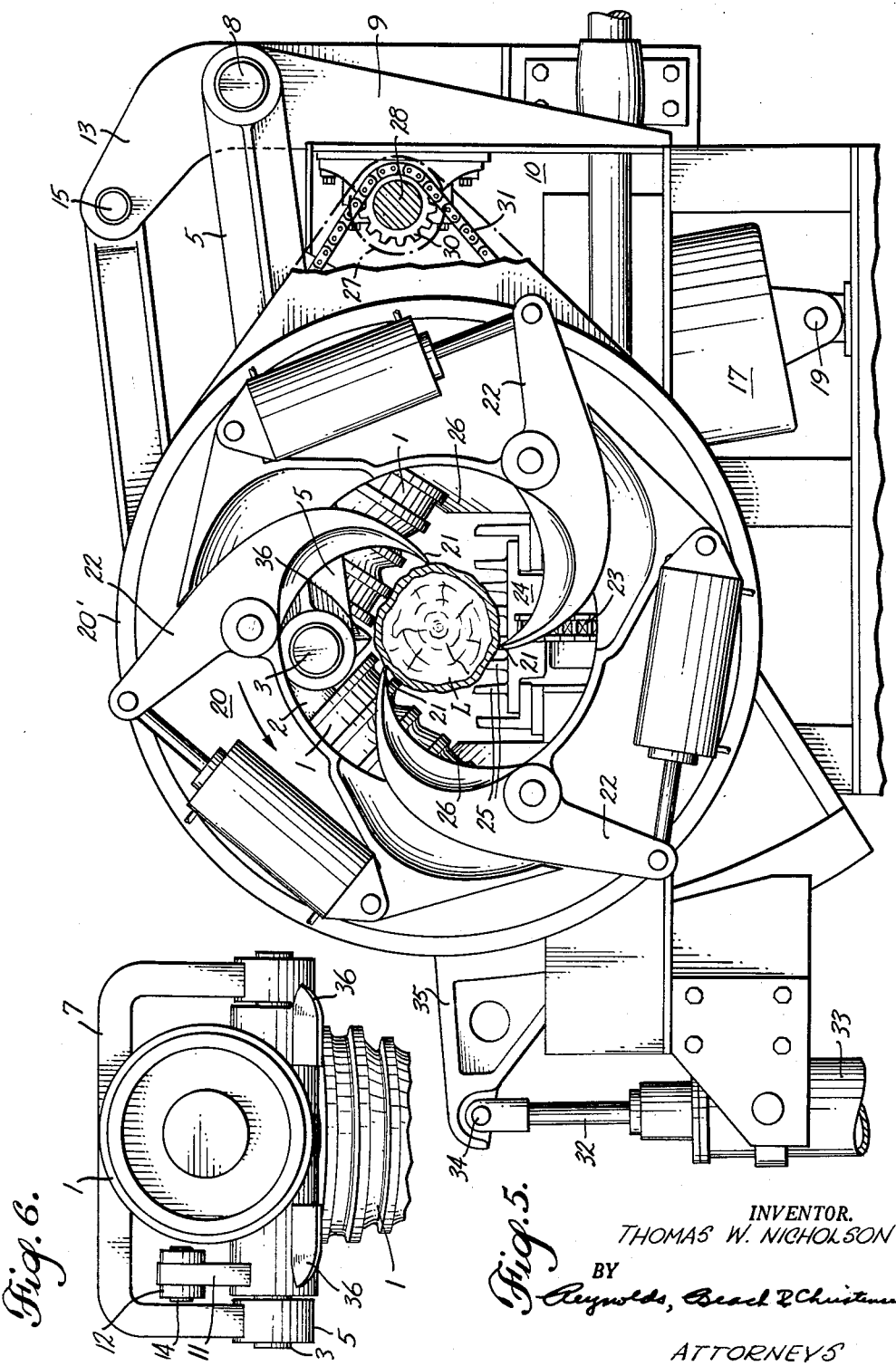

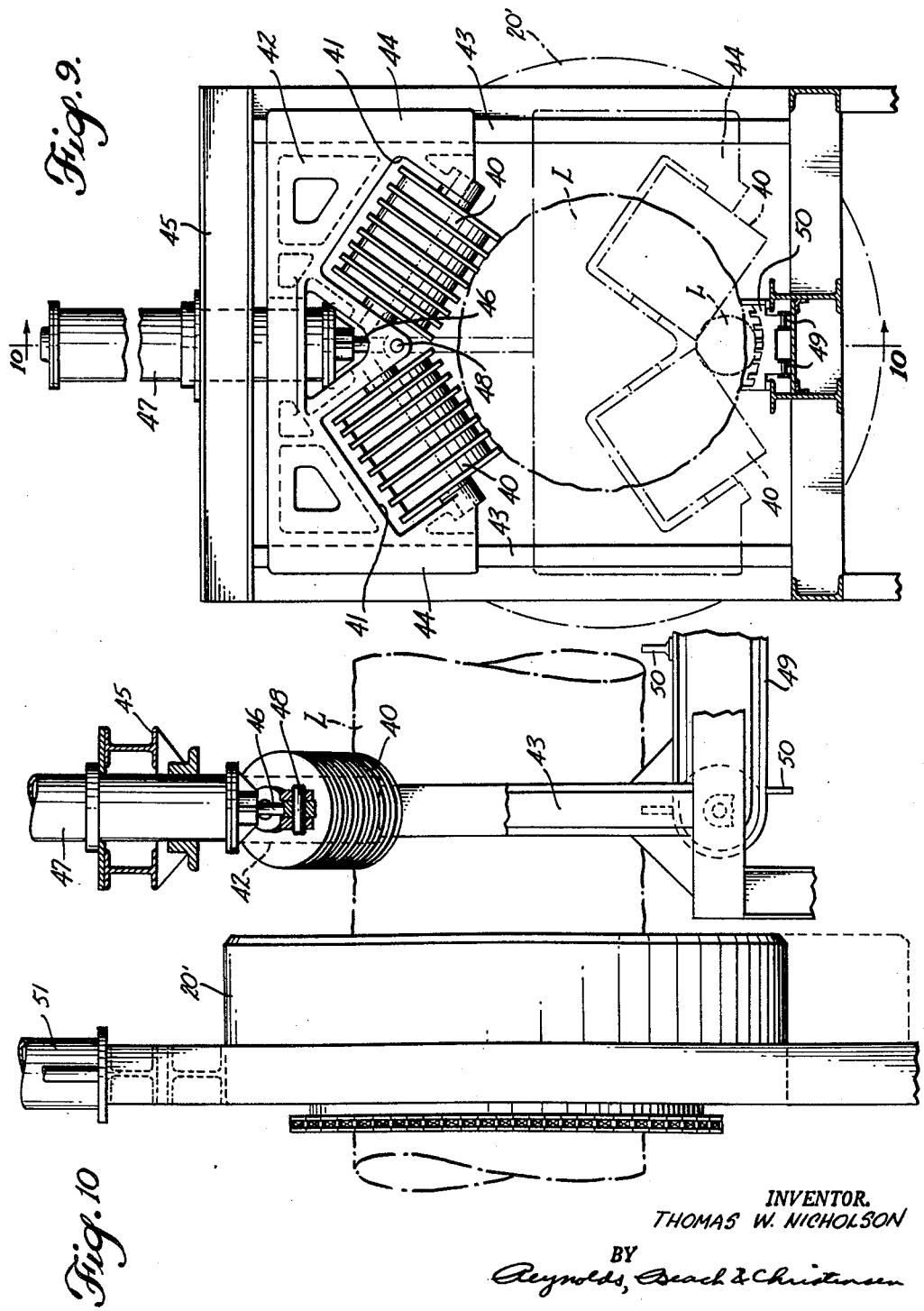

United States Patent Office 2,923,333
Patented Feb. 2, 1960

2,923,333

CENTERING LOG-BARKER ROLL HOLD-DOWN

Thomas William Nicholson, Auburn, Wash.

Application September 28, 1956, Serial No. 612,669

16 Claims. (Cl. 144—249)

The hold-down of the present invention is particularly useful in log barkers of the rotating-ring type serving the purpose of resisting rotation of the log which the torque of the barker ring, transmitted to the log through the barking tools scraping helically around the log, tends to induce.

A principal purpose of the hold-down is to center automatically relative to a predetermined lineal path a log being moved through the ring of a rotary-ring log barker. Such centering function eliminates the necessity of the operator manipulating controls to effect such centering.

Another object is to reduce the number of independently operable hold-down elements and the number of actuators required for the hold-down elements, the reduction in number of actuators usually being one-half of those previously required. Such reduction is made possible by a single actuator being effective to apply a force against either side of a log as may be necessary to move the log into a desired centered position.

It is also an object generally to decrease the number of parts of the hold-down mechanism, to make such mechanism more compact and to enable the hold-down mechanism to be adjusted quickly for holding down logs differing in size within a wide range. Specifically it is desired in one form of the invention to reduce the height of the hold-down.

An additional object is to provide a hold-down mechanism of rugged construction and massive proportions, utilizing the weight of the hold-down-mounting structure as well as positive actuators to exert a holding force on a log.

In one form of the apparatus it is an object to provide mechanism for swingably supporting the hold-down while at the same time maintaining the attitude of the hold-down relative to logs of different size substantially constant so as not to alter appreciably the direction of the forces applied to the log.

The various purposes and objects mentioned above can be accomplished by utilizing an idle-roll crotch type of hold-down which is supported for upward and downward movement by a suitable frame for engagement with logs of different size. During such upward and downward movement the attitude of the crotch is maintained substantially constant in a downwardly facing direction to saddle a log effectively for holding it down against the mechanism supporting and transporting a log through a barker ring. The peripheries of the hold-down rolls may have annular ribs on them and the log-supporting-and-transporting mechanism may also be provided with log-engaging projections which will grip the log when pressed against it to resist rotation of the log about its axis.

Figure 3 is an end elevation of the barker hold-down with parts in one adjusted position and Figure 4 is a similar elevation with parts in a different adjusted position.

Figure 5 is an enlarged-scale, vertical transverse section of the barker and hold-down looking in the opposite direction from Figures 3 and 4, as indicated by section line 5—5 of Figure 1, to show the relationship between the barker ring and the hold-down.

Figure 6 is a detail view of the hold-down per se as seen from the viewing line 6—6 of Figure 3.

Figure 9 (sheet No. 6) is an enlarged, fragmentary, vertical transverse section of the alternative type of hold-down mechanism and Figure 10 is partly a side elevation and partly a vertical longitudinal section taken on line 10—10 of Figure 9, parts being broken away.

Figure 7:
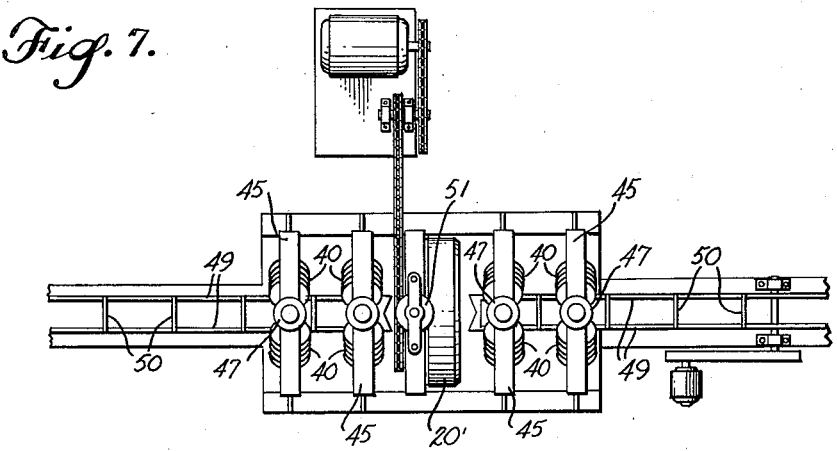
Figure 7 (sheet No. 1) is a plan view of a log barker incorporating a somewhat different type of hold-down mechanism shown rather diagrammatically

In my previous Patent No. 2,821,220, granted January 28, 1958, for Log Feed Mechanism, hold-downs are provided in the form of idle rolls engaging opposite upper quadrants or arcs of a log. In order to center a log, therefore, it is necessary to relieve the pressure applied by a hold-down toward which the log is to be moved and to manipulate the opposite hold-down to apply pressure for shifting the log in the direction toward which pressure is applied. The hold-down of the present invention does not require separate manipulation of hold-downs engaging the log at opposite sides of its central vertical plane. An important feature of the present hold-down is that it is a crotch saddled upon the upper side of the log and is arranged relative to the desired location of the log so that when it exerts pressure on the log one side or the other of the crotch will exert greater pressure depending upon the location of the log. If the log is not centered in the position desired, such pressure will automatically be applied on the side of the log required to shift the log into centered position.

The preferred form of hold-down which is shown in the drawings is an idle-roll crotch facing downwardly. As shown in Figures 1 to 6, inclusive, two separate idle rolls 1 are journaled in a crotch-roll-mounting block 2 with their axes intersecting in a downwardly facing obtuse angle. Being separate, the rolls may be turned at different speeds by engagement with a log. The rolls are substantially cylindrical so as to avoid one part of the periphery skidding on the log while another part rolls on it. The block provides journals for the roll bearing, said journals projecting from the upper ends of the rolls and supporting them in cantilever fashion. The angle included between the axes of the rolls is of fixed size and such angle will be selected so that the idle rolls exert a firm grip either on a relatively large log, such as shown in Figure 3, or on a relatively small log such as shown in Figure 4.

The crotch-mounting block 2 has through it a bore extending perpendicular to the plane defined by the intersecting axes of the rolls 1 through which bore extends a shaft 3 journaled in side arms 4 and 5 of a crotch-supporting frame. This frame is completed by a crossbar 6 interconnecting the central portions of the side arms and by a yoke 7 spanning the crotch-roll-mounting block 2 and connecting the swinging ends of arms 4 and 5. This frame is supported for swinging of its end carrying the roll crotch by a pivot shaft 8. This shaft in turn is mounted in brackets 9 which project upward from a base 10 of the barker. The pivot shaft 8 is thus fixed in location and the crotch block 2 and rolls 1 can be adjusted upward and downward by swinging the frame 4, 5, 6, 7 about the axis of shaft 8.

In order to enable the crotch hold-down to engage and center a log by exerting the proper lateral pressure upon it, it is necessary to maintain the roll-mounting block 2 in a position such that the crotch always faces downward. For this purpose, guide means are provided which, with the crotch-block-supporting frame of Figures 2 and 3 constitute substantially parallel-motion linkage. Such guide mechanism includes an arm 11 projecting upward from the crotch block 2 and having its lower end integral with such block. A link 12, disposed generally parallel to the frame 4, 5, 6, 7 as shown in Figures 3 and 4, connects, by means of pivots 14 and 15, respectively, the upper end of arm 11 with the upper end of a post 13 extending upward from the base 10. The relative dimensions of the frame 4, 5, 6, 7 and the link 12, as well as the locations of the frame pivot shaft 8, the crotch shaft 3 and the pivots 14 and 15, are selected so that as the frame swings upward and downward the arm 11 will always be maintained in upright position. While this arm may tilt slightly, the roll crotch will always definitely be facing downward so as to saddle a log properly whatever its size.

As a log L initially is being moved into a position beneath the hold-down crotch it usually is desirable to raise the roll crotch positively to afford ample clearance for the log. For this purpose a fluid-pressure jack including a piston rod 16 received in a cylinder 17 is provided. The piston rod is connected to the crossbar 6 of the frame 4, 5, 6, 7 by a pivot 18 and the cylinder 17 is mounted on the base 10 by a pivot 19. This jack should be of reasonably heavy construction because of the massive character of the frame, roll-mounting block 2 and rolls 1, 1 which it must lift. The pivot 18 should be spaced from the pivot shaft 8 as far as possible to afford good leverage on the crotch-supporting frame.

When the log has been moved under the hold-down, the pressure of fluid in the cylinder 17 acting upward on the piston to which piston rod 16 is connected can be released so that the crotch hold-down will move downward into position astride the log, whether the log is large as shown in Figure 3 or small as shown in Figure 4. To hold the log firmly downward, fluid under pressure may be supplied to the cylinder 17 at the upper side of the piston (by conventional means not illustrated) so that the jack in that case will pull the frame positively downward to press the hold-down firmly against the log. As the frame 4, 5, 6, 7 is swung about the pivot shaft 8 to engage the hold-down with logs of different size, the hold-down will be shifted horizontally coincidentally with the vertical adjustment. Such horizontal shift of the hold-down will be minimized, however, if the frame pivot shaft 8 is located in elevation approximately half-way between the highest and lowest positions of adjustment of the hold-down. Such location is shown in the drawings, resulting in the frame being inclined upwardly from the pivot shaft 8 when the hold-down is engaged with a comparatively large log as shown in Figure 3 or is raised to its uppermost position, and the frame slopes downward from the pivot shaft 8 when the hold-down is engaged with a small log as shown in Figure 4. The horizontal component of movement of the shaft 3 with this type of construction is sufficiently small that it is not objectionable.

Figure 1:
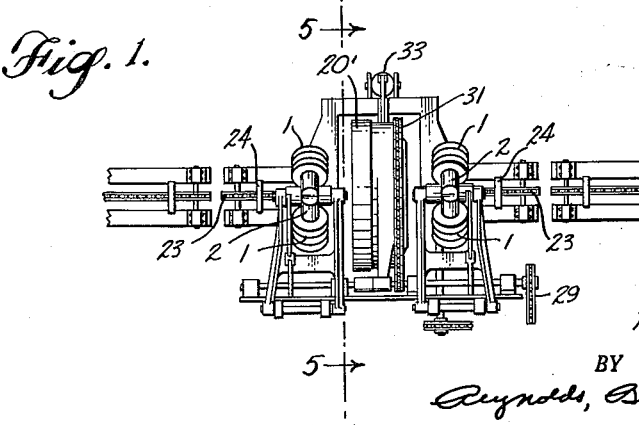
Figure 1 is a plan view of a rotary-ring log barker incorporating hold-down mechanism of the present invention shown somewhat diagrammatically.
Figure 2:
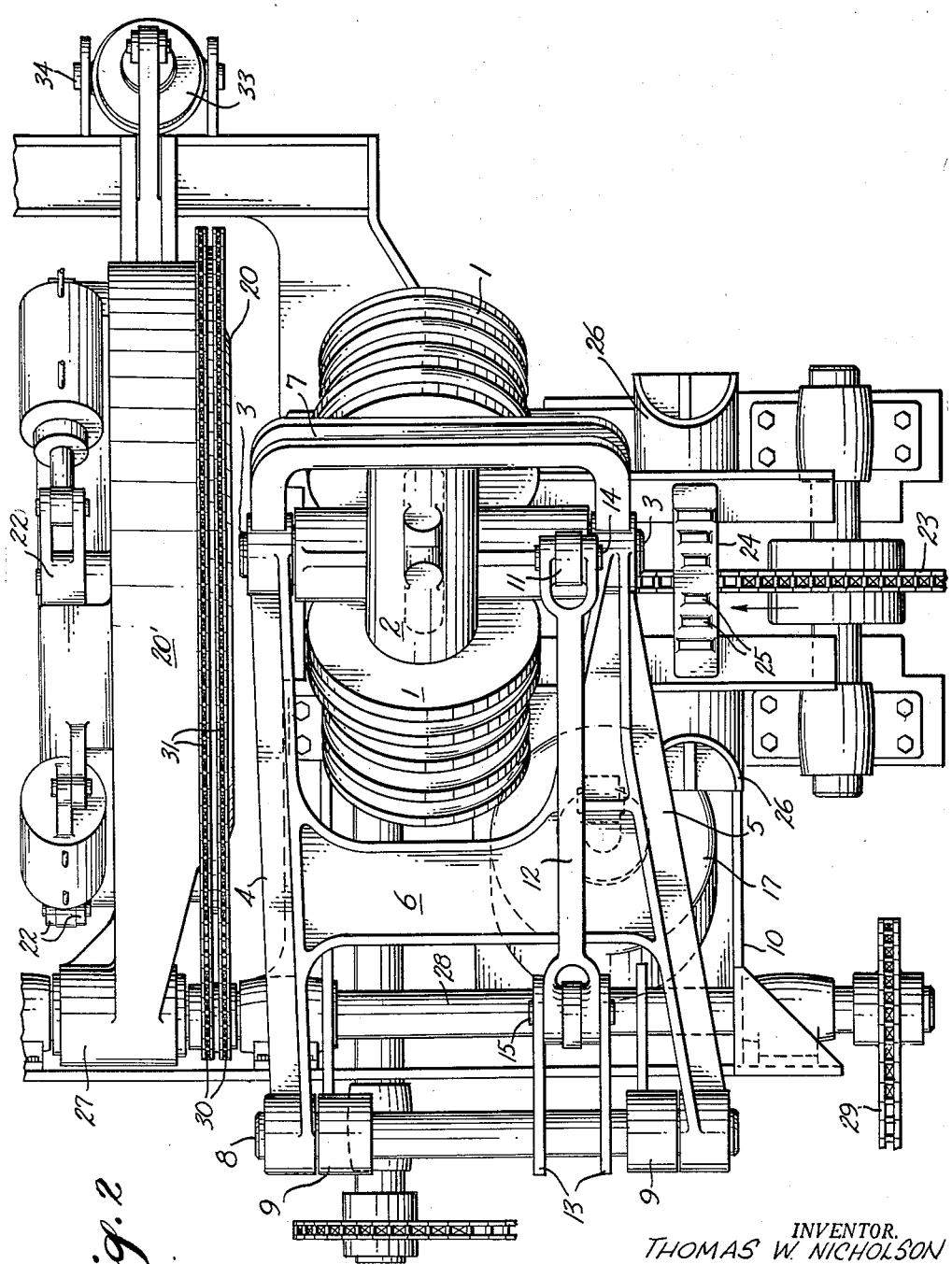
Figure 2 is an enlarged scale plan view of a hold-down unit at one end of the log barker.

In order to utilize a hold-down of the type described for holding a log against rotation about its axis while the bark is being removed from the log by a rotary-ring type of barker, it is desirable for the hold-down to be located reasonably close to a ring 20 which carries the barking tools. In the arrangement of Figure 1 a roll crotch hold-down is located reasonably close alongside each end of the barking ring. The log L is supported and moved nonrotatively through the barking ring so that barking tools 21 mounted on swinging arms 22 will move in spiral paths around the log. While various types of feed mechanism such, for example, as shown in my patent mentioned above, could be used to move the log through the barker, a jack chain 23 is shown as being used for this purpose. The chain 23 carries flights 24 which have very pronounced upstanding projections 25 firmly engageable by the log when it is pressed downward to resist strongly rotation of the log L about its axis. The contact of the rolls 1 with the log may also be improved to resist rotation of the log by providing a plurality of sharp-edged annular ribs on the rolls as shown.

A log L being moved into the barker ring by the jack chain 23 can be centered approximately by locating guide pillars 26 alongside the path of chain movement so that the pillars, if engaged by a log, will deflect the log in one direction or the other transversely of its direction of movement to enable the log to pass between the pillars. Any log passing between the pillars will be located sufficiently accurately to move through the aperture of the barker ring 20 so shown best in Figure 3 and will be engageable by the hold-downs. The barker ring may be raised and lowered by a fluid-actuated jack 32, 33 so that its center will coincide approximately with the axis of the particular log L to be barked. Thus one side of a ring-supporting frame 20' can be pivotally mounted by a bearing 27 to swing about the axis of a shaft 28 which is rotated by a chain 29 engaging a sprocket on the shaft to drive the barking ring 20. This shaft will rotate sprockets 30 which engage barking-ring drive chains 31. These chains, in turn, are engaged with large annular sprockets arranged around the periphery of the ring 20.

The ring-supporting frame 20' can be raised and lowered by the fluid-actuated jack including the piston rod 32 movable by fluid under pressure in the cylinder 33. This jack is pivotally connected by a pin 34 to an arm 35 on that side of the barking-ring-supporting frame 20' opposite the shaft 28. Usually, therefore, the jack 32, 33 will be actuated to swing the supporting frame 20' for the barker ring 20 to a different position approximately simultaneously with actuation of the jack 16, 17 to move the hold-down, so as to accommodate a new log which is of a size different from the log barked just previously.

Where successive logs do not differ greatly in size it is not necessary for the operator to reverse the application of fluid under pressure in cylinder 17 of the hold-down jack from the top of the piston to the bottom. On the contrary a steady pressure can continue to be applied to the upper side of the piston and when the rolls 1 are rolling off a log from which the bark has been removed the rolls can drop slightly onto the end of the next log if it is somewhat smaller, or the rolls will be wedged upward by the end of the next log if it is somewhat larger than the log from which the bark has been removed. Since the fluid under pressure in the cylinder 17 is not trapped and in any event preferably is a compressible gas, the positive engagement of a larger log with the crotch hold-down will draw the piston rod 16 sufficiently out of the cylinder 17 against the action of fluid under pressure within it so that the crotch hold-down can engage the larger log without attention by the operator.

For improving the engagement of the crotch hold-down with comparatively small logs such as shown in Figure 4, and also to enable a log of considerably larger diameter to engage and raise the hold-down automatically, an entering shoe 36 can be provided on the under side of the crotch-roll-mounting block 2 between the two rolls. Preferably this shoe has a downwardly projecting ridge engageable with the log and the entering end of the shoe ridge may slope upward to make wedging contact with the larger log end for raising the hold-down as the log approaches it. By filling the space between the adjacent ends of the rolls 1 the shoe 36 also will deter passage of a projection between the rolls where it might become jammed and thus interrupt continuous lengthwise movement of the log.

Figure 8:
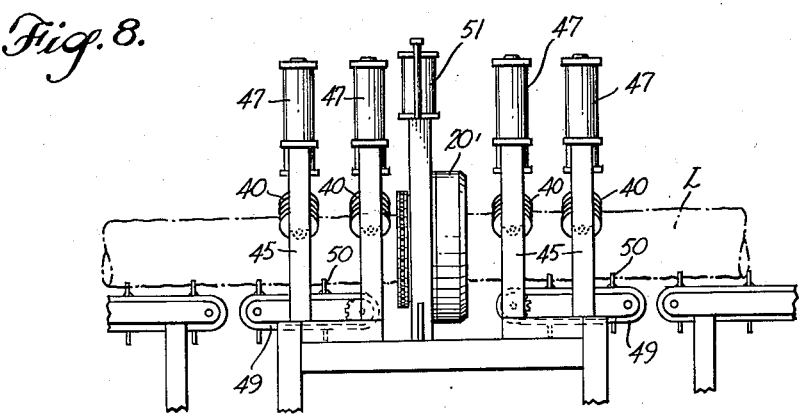
Figure 8 is a side elevation of such barker and hold-down mechanism.

While the type of barker and hold-down arrangement shown in Figures 1 to 6 has advantages of compactness and low height because both the barking ring and the hold-down are pivotally supported from the side of the apparatus, it is not objectionable for some installations to have a considerably higher apparatus and, in these cases, it may actually be preferable to reduce the width of the barker assembly for conserving floor area. Consequently, a hold-down having many of the advantages of the construction described above can be incorporated in the alternative type of apparatus illustrated in Figures 7 to 10, inclusive. In the illustration of this alternative type of hold-down mechanism in Figures 7 and 8, two hold-down units are shown at each side of the rotary barking ring and its supporting frame 20'. For some installations, however, a single hold-down unit at each side of the barking ring may be adequate as illustrated in Figure 1.

The alternative type of hold-down shown in Figures 7 to 10, inclusive, like that previously described utilizes an idle-roll crotch. In this instance, two rolls 40 are received respectively in recesses 41 of a frame 42 and bearing supports are provided for the roll axles which maintain such axles at a predetermined downwardly facing obtuse angle with their axes crossing. In this instance, bearings are provided for both ends of the roll axles, although the rolls could be mounted in cantilever fashion if desired as in the type of apparatus described above. The frame 42 and rolls 40 are bodily movable vertically so as to raise and lower the roll crotch hold-down for engagement with the upper surfaces of logs of different sizes.

The hold-down mounting frame 42 is guided for upward and downward movement by upright parallel ways 43 located at opposite sides of the path of a log L through the barking machine. These ways are engaged by guide channels 44 along opposite sides of the frame 42 both for the purpose of maintaining the hold-down in a proper and constant space relationship to the barking ring and also to prevent the hold-down from tilting to shift its crotch out of its downwardly directed position. The upper ends of the ways 43 are secured together by a crossbar 45 which carries an upright actuator jack. A piston rod 46 of this jack is reciprocable in a cylinder 47 and is connected by a pivot 48 to the vertically adjustable frame 42.

As in the type of barking apparatus described previously, a log may be transported nonrotatively lengthwise through the barking ring 20 by any suitable log-feeding machanism, but conveniently such mechanism may be a jack chain 49 having log-supporting flights 50. As shown in Figure 9 these flights have sharp projections and the rolls 10 have circumferential ribs which engage logs firmly to prevent them from being rotated about their axes by the force exerted on such logs by the tools carried by the ring 20. The jack 47 is of the double-acting type so that fluid under pressure can be admitted (by conventional means not illustrated) beneath the piston in the cylinder to raise the frame 42 while a log L is moved by the jack chain 49 into a position beneath the hold-down. The fluid under pressure may then be released from the cylinder (by conventional means not illustrated) so that the hold-down will drop downward until the rolls 40 bear on the upper surface of the log.

Fluid under pressure may be admitted to cylinder 47 above the piston in it so as to exert a downward force on the piston rod 46 for pressing the hold-down rolls firmly against the log whether the log be large or small as indicated in phantom in Figure 9. Pressure applied to the log by the roll crotch will be exerted with greater force by one of the rolls 40 than the other if the log is not centered beneath the hold-down and consequently relative to the rotary barking ring 20. The greater force applied by one roll will shift the log toward the opposite roll as described above until the log has been centered automatically by the hold-down. The ways 43 engaged by the guides 44 will act both to prevent bodily movement of the hold-down transversely of the log by unequal forces caused by pressure on an off-center log, and will prevent appreciable tilting of the hold-down by such forces.

Whichever type of mounting is employed for the idle-roll crotch hold-down, the operator need only control one actuator in order to apply the hold-down properly to the log. Disposition of the rolls of the hold-down with their axes at a downwardly facing obtuse angle will cause engagement of one roll or the other first with the log if it is not properly centered below the hold-down and continued pressure will move the log in the proper direction to center it. Thereafter the hold-down will maintain the log centered as it moves through the barking ring without attention on the part of the operator even though the log may be highly tapered or even bent. In using the barking machine shown in Figures 7 to 10, inclusive, the height of the barking ring and its supporting frame 20' will be adjusted by the operator controlling a fluid actuator 51 similar to the adjustment accomplished by manipulation of the jack 32, 33 in the barking apparatus shown in Figures 1 to 6, inclusive.

I claim as my invention:

1. A log-hold-down comprising a downwardly facing crotch, downwardly diverging axles mounted in said crotch on opposite sides thereof, rolls mounted respectively on said axles and engageable with the upper side of a log, supporting means mounting said crotch for upward and downward movement, guide means independent of said supporting means, connected to said crotch and resisting appreciable tilting of said crotch relative to said supporting means when greater pressure is applied to one of said rolls than to the other by engagement with a log.

2. A log hold-down comprising a downwardly facing crotch having rolls on opposite sides thereof diverging downwardly, engageable with the upper side of a log and rotatable about coplanar axes intersecting in a downwardly facing obtuse angle, and supporting means mounting said crotch for upward and downward movement and resisting appreciable tilting of said crotch when greater pressure is applied to one of said rolls than to the other by engagement with a log.

3. The log hold-down defined in claim 2, and an entering shoe mounted on the crotch between the upper ends of the rolls and engageable with the upper surface of a log.

4. The log hold-down defined in claim 2, in which the supporting means includes a frame, frame-supporting means supporting said frame to swing about an axis extending transversely of the plane containing the roll axes, and means mounting the crotch on the swinging end of said frame.

5. The log hold-down defined in claim 4, and a fluid-pressure-operated jack connected to the frame between the frame-supporting means and the crotch-mounting means for swinging the frame about the axis of the frame-supporting means.

6. The log hold-down defined in claim 4, in which the frame-supporting means guides the frame for movement of its swinging end about a substantially horizontal axis between positions above and below such axis.

7. The log hold-down defined in claim 4, an arm projecting from the crotch transversely of the frame, and a link disposed generally parallel to the frame and connected to said arm for effecting swinging of the crotch relative to the frame as the frame is swung to prevent appreciable tilting of the crotch during swinging of the frame.

8. The log hold-down defined in claim 4, in which the crotch includes a roll-mounting block, and means mounting the rolls on said block in cantilever fashion diverging downwardly from said block for rotation relative thereto.

9. The log hold-down defined in claim 2, and means rotatively mounting both ends of each roll.

10. The log hold-down defined in claim 2, in which the supporting means includes a frame, and upright ways engageable by said frame for guiding it to move upward and downward and for resisting tilting of said frame.

11. The log hold-down defined in claim 10, and a fluid-pressure-operated jack connected to the frame and operable to shift the frame along the ways.

12. A log hold-down comprising a downwardly facing crotch, downwardly diverging axles mounted in said crotch on opposite sides thereof, rolls mounted respectively on said axles and engageable with the upper side of a log, supporting means, pivot means connecting said crotch to said supporting means for upward and downward movement, and guide means independent of said supporting means, connected to said crotch and resisting appreciable tilting of said crotch relative to said supporting means about said pivot means when greater pressure is applied to one of said rolls than to the other by engagement with a log.

13. Log hold-down mechanism comprising means operable to support and to transport a log, a downwardly facing crotch hold-down disposed above said log-supporting and log-transporting means, and supporting means mounting said hold-down for upward and downward movement and resisting appreciable tilting of said hold-down transversely of a log supported by said log-supporting and log-transporting means when pressure is applied to one side of said hold-down by engagement with a log, and including a frame, frame-supporting means at one side of said log-supporting and log-transporting means and supporting said frame to swing about an axis extending lengthwise of said log-supporting and log-transporting means, and means mounting said hold-down on the swinging end of said frame.

14. The log hold-down mechanism defined in claim 13, and jack means connected to the frame between the frame-supporting means and the hold-down and operable to swing the frame for altering the height of the hold-down.

15. A log hold-down comprising a downwardly facing crotch, downwardly diverging axles mounted in said crotch on opposite sides thereof, rolls mounted respectively on said axles and engageable with the upper side of a log, supporting means mounting said crotch for upward and downward movement, and a guide link independent of said supporting means, pivotally connected to said crotch and resisting appreciable tilting of said crotch relative to said supporting means when greater pressure is applied to one of said rolls than to the other by engagement with a log.

16. A log hold-down comprising a downwardly facing crotch, downwardly diverging axles mounted in said crotch on opposite sides thereof, rolls mounted respectively on said axles and engageable with the upper side of a log, supporting means, pivot means connecting said crotch to said supporting means for upward and downward movement, slide means independent of said supporting means and connected to said crotch, and guide means engaged by said slide means for relative movement as said supporting means moves said crotch upward or downward, such engagement of said guide means and said slide means resisting appreciable tilting of said crotch relative to said supporting means about said pivot means when greater pressure is applied to one of said rolls than to the other by engagement with a log.

References Cited in the file of this patent

UNITED STATES PATENTS

| Number | Name | Date |
|---|---|---|
| 397,114 | Dolsen | Feb. 5, 1889 |
| 1,277,808 | Witham | Sept. 3, 1918 |
| 1,943,649 | White et al. | Jan. 16, 1934 |
| 1,957,792 | McManis | May 8, 1934 |
| 2,025,337 | Camden et al. | Dec. 24, 1935 |
| 2,341,640 | Melhorn | Feb. 15, 1944 |
| 2,501,848 | Johnson | Mar. 28, 1950 |
| 2,540,994 | Rogers | Feb. 6, 1951 |
| 2,669,266 | Bouchard | Feb. 16, 1954 |
| 2,771,922 | Gyllenberg | Nov. 27, 1956 |
| 2,774,397 | Leffler | Dec. 18, 1956 |
| 2,779,363 | Laughton | Jan. 29, 1957 |

FOREIGN PATENTS

| Number | Country | Date |
|---|---|---|
| 1,091,890 | France | Nov. 3, 1954 |